United States Patent [19]

Nomura et al.

[11] 4,065,797

[45] Dec. 27, 1977

[54] MULTI-ELEMENT MAGNETIC HEAD

[75] Inventors: Noboru Nomura, Kyoto; Kenji Kanai, Neyagawa; Nobuyuki Kaminaka, Moriguchi; Norimoto Nouchi, Katano, all of Japan

[73] Assignee: Matsushita Electric Industrial Co., Ltd., Kadoma, Japan

[21] Appl. No.: 641,224

[22] Filed: Dec. 16, 1975

[30] Foreign Application Priority Data

Dec. 20, 1974 Japan .................................. 49-147384
Dec. 24, 1974 Japan .................................... 49-2743
Dec. 24, 1974 Japan .................................... 49-2742

[51] Int. Cl.² .......................... G11B 5/12; G11B 5/22
[52] U.S. Cl. .................................. 360/113; 360/122; G11B/5/22
[58] Field of Search ................ 360/113, 110, 119–126; 340/174 EB

[56] References Cited

U.S. PATENT DOCUMENTS

B 371,787  1/1975  Thompson ........................... 360/113
3,908,194  9/1975  Romankiw ........................... 360/122
3,921,218  11/1975 Kayser ................................. 360/125
3,940,797  2/1976  Brock .................................. 360/122
3,975,772  8/1976  Lin ...................................... 360/113

Primary Examiner—Robert M. Kilgore
Attorney, Agent, or Firm—Stevens, Davis, Miller & Mosher

[57] ABSTRACT

A multi-element made magnetic head having a plurality of magnetoresistive elements of a ferromagnetic material such as permalloy formed on a base of a ferromagnetic material such as ferrite is disclosed. The ferromagnetic material base is formed with a groove, which is common for all elements made extends parallel to the recording medium. It is filled with a non-magnetic material such as glass, and the individual magnetoresistive elements are disposed so as to bridge the groove and are not adapted to be in direct frictional contact with the recording medium for reducing their wear. The magnetoresistive elements are also made to extend perpendicular to the recording medium so as to increase the head density or reduce the head pitch.

13 Claims, 10 Drawing Figures

MULTI-ELEMENT MAGNETIC HEAD

FIELD OF THE INVENTION

This invention relates to multi-element magnetic heads and, more particularly, to multi-element magnetic heads having a plurality of magnetoresistive elements consisting of a ferromagnetic material such as permalloy formed on a base of a ferromagnetic material such as ferrite.

BACKGROUND OF THE INVENTION

Figure 1:
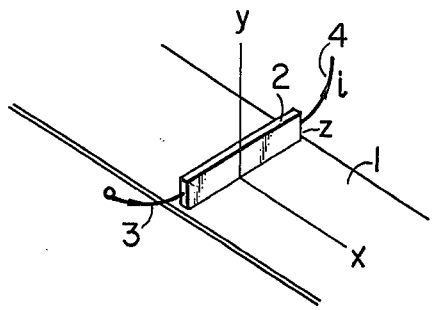
FIG. 1 is a perspective view showing the basic construction of the prior art magnetic head.

Conventionally, magnetic heads utilizing the magnetoresistive effect, that is, the face that the electric resistance of a ferromagnetic body changes when a magnetic field is applied thereto, have principally a construction as shown in FIG. 1. More particularly, a magnetoresistive effect element 2 consisting of a ferromagnetic thin plate is disposed normal (i.e., in the y direction) to a recording medium 1 and held in frictional contact or in slidable contact therewith. In operation, a constant current is passed between electrodes 3 and 4 which are provided respectively on the magnetoresistive effect element 2 at each of the two ends in the longitudinal direction (i.e., in the z direction) thereof, and a change in resistance in the z direction due to a signal field in the y direction from the recording medium 1 is detected in terms of a change in voltage between the electrodes 3 and 4.

Figure 2:
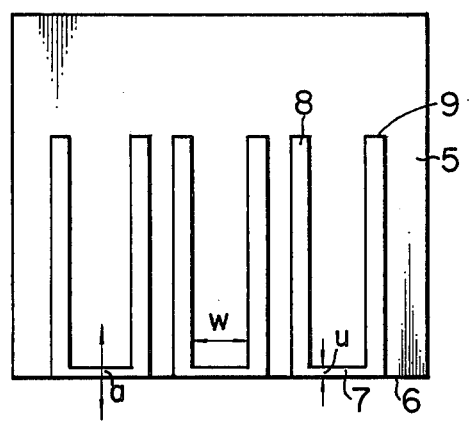
FIG. 2 is a view showing an example of the prior art multi-element magnetic head.

The above principles are employed to construct a multi-element magnetic head, for instance having the construction shown in FIG. 2. Here, the individual elements 7 consist of a film of an anisotropic ferromagnetic conductor such as permalloy formed on a base 5 of a non-magnetic insulating material such as glass with their hard axis for magnetization set in the direction of arrow a. Electrodes 8 and 9 are provided respectively on each of the two ends of each magnetoresistive effect element so as to detect the voltage between them, and a face 6 of the base 5 is adapted to be in frictional contact with a recording medium.

In this system, the signal field intensity reduces as an exponential function of the distance from the recording medium 1. Particularly, in the range of short wavelength recording the attenuation of the signal field in the width direction u of the magnetoresistive effect element 2 becomes extreme. Further, with this head construction extreme reduction of the width w corresponding to the head track width leads to reduced output voltage. It may be thought to increase the output voltage by reducing the width u of the element 2 and hence increasing the current density. However, increasing the density of track pitch raises many manufacturing problems and also leads to undesired deterioration of wear resistance so that it is not feasible in practice.

SUMMARY OF THE INVENTION

In the light of the above prior art, this invention has for its object to provide a multi-element magnetic head, in which each magnetoresistive effect element is not adapted to be in direct frictional contact with the recording medium but magnetic flux therefrom is led through flux converging core means to the element to thereby improve the efficiency of the magnetoresistive element and also improve the wear resistance. Each element also comprises a ferromagnetic material base formed with a groove such as to have the individual magnetoresistive effect elements extend normal to the recording medium, thereby obtaining a more dense head arrangement or narrow head pitch compared to similar prior-art heads. In addition, in accordance with the invention a common electrode connected to one end of each of the magnetoresistive effect elements is provided to reduce the number of voltage take-out electrodes in each element. This also contributes to a more dense head arrangement or narrow head pitch compared to the prior art heads.

Another object of the invention is to obtain a reproduced output free from distortion by forming a bias field generation coil on or over the groove formed in the ferromagentic material base and applying a common bias field to all of the elements.

DETAILED DESCRIPTION

Figure 3:
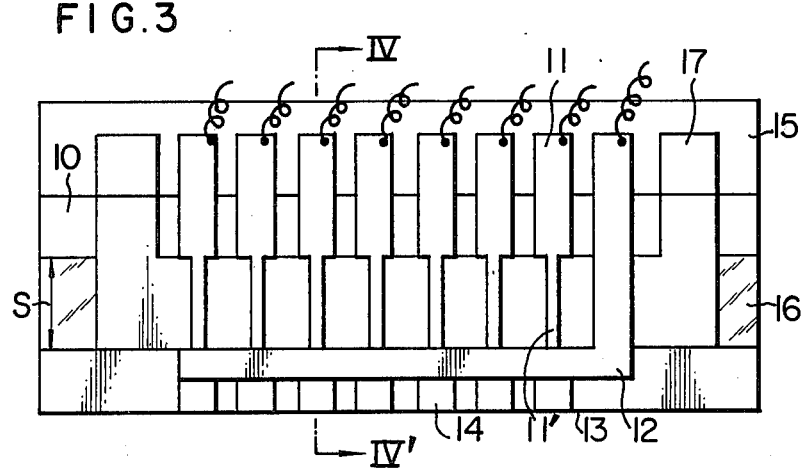
FIG. 3 is a plan view showing an embodiment of the invention.
Figure 4:
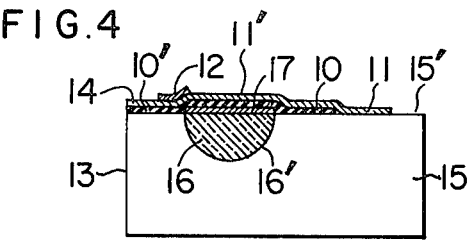
FIG. 4 is a section taken along line IV - IV' in FIG. 3.

An embodiment of the multi-element magentic head according to the invention, as shown in plan view in FIG. 3 and in section in FIG. 4, will now be described in the order of steps of its manufacture. Designated at 15 is a ferromagnetic material base formed with a groove 16' which is filled with a non-magnetic material 16 such as glass. While the groove 16' in this example has an arcuate profile as shown in FIG. 4, it may as well have any other suitable shape provided that the magnetoresistive effect element (hereinafter referred to as the MR element) does not directly face any ferromagnetic material. The surface of the groove 16' in the base 15 is polished so that there is no unevenness along the boundary between the non-magnetic material 16 and base 15. When the ferromagnetic material base 15 is made of a ceramic such as ferrite, which offers comparatively high resistance, any conductor such as aluminum can be directly provided on the base 15 by means of evaporation or the like without giving rise to any problem. In case of using a conductive ferromagetic material such as permalloy for the base 15, on the other hand, direct provision of a conductor such as aluminum on the base 15 cannot be made but an electric insulation film is required on the surface 15' of the base 15 and non-magnetic material 16. The electric insulation film may be formed by evaporating a material such as SiO or $SiO_2$. Then, a film of a conductive material such as aluminum or copper is formed on the base surface by means of evaporation or the like and is processed by means of photoetching or electron beam processing techniques etc. to form a bias coil 17, which is common to all elements and has a shape as shown in FIG. 3, on the nonmagnetic insulating material 16. An insulating layer 10 is then formed to cover the bias coil 17 except for certain portions thereof and be flush with the base face 13 to be in contact with the recording medium, thus forming a gap section 10' in the magnetic circuit. Then, MR elements 11' are formed by forming a ferromagnetic material film by means of evaporation or sputtering on the insulating layer 10 such that their easy axis is, for instance, normal to their longitudinal direction. It is effective to make the MR elements 11' long enough to straddle the entire width S of the groove 16'. Simultaneously with the MR elements 11', high permeability flux converging cores 14 are provided between the groove 16' and the face 13 to be in contact with the recording medium, and also other flux converging cores 11, which also serve as signal take-out electrodes, are provided on a portion distant from the recording medium with reference to the groove 16'. The MR elements 11' may be simultaneously manufactured together with the flux converging cores 14 and electrodes 11 which are formed on both sides of the MR elements 11' from a thin film of a ferromagnetic material having magnetic anisotropy such as permalloy by such means as photoetching or electron beam processing techniques. Then, a common electrode 12 common to all the elements is formed between the groove 16' and the face 13 for contact with the recording medium such that it is connected to all the elements and that the voltage induced in each element is taken out in the direction away from the face 13 in contact with the recording medium.

The magnetic head according to the invention is multi-channel head particularly for reproducing recorded signals, and in its operation a voltage induced across each MR element 11' is detected. In operation, a signal magnetic field that appears from a recording medium extending in the proximity of the frictional face 13 is induced through the ferromagnetic material base 15 and the flux converging core 14 such that the magnetic gap section 10' is traversed by the magnetic flux which passes through the ferromagnetic base 15 and the magnetic flux which passes through the converging core 14 to thereby couple a magnetic potential across the ends of the MR element, that is, to one end thereof directly from the converging core 14 and to the other end thereof through the flux converging core 11 which serves also as a signal take-out electrode which core 11 faces or is opposed to the ferromagnetic base 15. Meanwhile, current is passed from each electrode 11 provided on each MR element 11' through the element 11' to the common electrode 12 electrically connected to each converging core 14, and the potential difference between the electrodes 11 and 12 is taken out as a signal. When the signal field changes, the magnetic potential across both ends of the MR element 11' is changed to change the resistance of the MR element, thus changing the potential difference between electrodes 11 and 12 so that the recorded signal can be read out. The electrode 11, MR element 11' and flux converging core 14 are integral.

Figure 5:
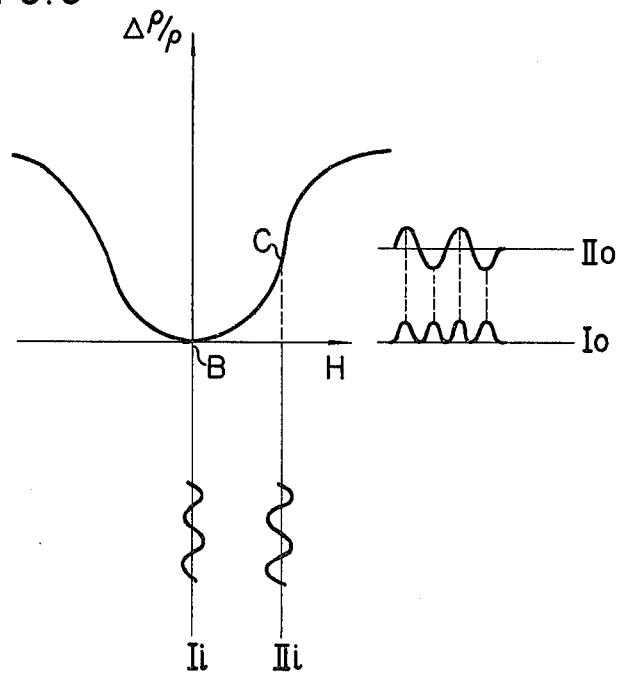
FIG. 5 is a graph illustrating the relationship between magnetoresistance change rate and applied field.

FIG. 5 shows a characteristic of the magnetic field H set up in the permalloy versus the resistance change rate $\Delta\rho/\rho$. Indicated at $I_i$ and $II_i$ are input signal fields, and at $I_o$ and $II_o$ are output voltages representing the corresponding resistance changes. The magnetoresistive effect of permalloy is notable in the neighborhood of a field at which rotating field magnetization begins to appear, and the resistance change rate goes to saturation when the magnetization is saturated as the rotating magnetization is completed. When no bias is applied to the magnetoresistive effect element, and the input field $I_i$ is applied thereto, the output voltage $I_o$ has double the input frequency as will be readily understood from the fact that the curve of the magnetoresistive effect is symmetrical with respect to the ordinate axis. Also, the distortion of the output waveform is considerable because in this case the working point is in a non-linear portion of the curve. On the other hand, when bias is given to the magnetoresistive effect element through the bias coil 17 to shift the working point from the non-bias point B to point C, as the input signal field $II_i$ is applied the output waveform $II_o$ has the same frequency as the input signal and is less distorted in this case since a portion of the magnetoresistive effect curve of superior linearity can be utilized, so that it is possible to obtain satisfactory reproduction.

In addition, with a groove provided in the ferromagnetic material base the MR elements can be arranged so as to bridge the groove, and also with the provision of the common electrode common to all the elements for taking out the resistance change in each MR element due to the magnetic flux change therein, the drawback inherent in the prior-art multi-element magnetic head, namely the difficulty of increasing the density of the element arrangement and record density because of the impossibility of greatly reducing the width W corresponding to the track width of the MR element, is overcome. In other words, each MR element 11' is formed such that the signal flux is led through the converging core 14 to it and that its longitudinal direction is normal to the frictional face 13, thus permitting reduction of the track pitch of the MR elements or increase in the density of the arrangement of the elements and also to provide only a single electrode in each element unlike the prior art wherein each element requires two electrodes. Further, while the connection of each element and associated lead to an external circuit is effected by such means as soldering and wire bonding through supersonic frictional contact, the area of contact between the lead and electrode is usually very large and imposes a limitation upon the reduction of the track pitch. Since according to the invention one end of each magnetoresistive effect element is connected to the common electrode, only a single electrode is needed individually for each element, so that it is possible to obtain reproduction of a more dense record signal.

Another embodiment of the invention will now be described, in connection with FIG. 6 which is a plan view thereof and FIG. 7 which is a sectional view thereof.

A ferromagnetic material base 23 is provided with a groove 24' which is filled with a non-magnetic material 24 such as glass. While the groove 24' has an arcuate profile as shown in FIG. 7, it may as well have any other suitable shape provided the magnetoresistive effect element (MR element) does not directly face any ferromagnetic material. The surface of the groove 24' of the base 23 is polished so that there is no unevenness along the boundary between the non-magnetic material 24 and base 23. When the ferromagnetic material base 23 is made of ceramic such as ferrite, which offers comparatively high resistance, any conductor such as aluminum can be directly provided on the base 23 by means of evaporation or the like without giving rise to any problem. In case of using a conductor such as permalloy for the base 23, a conductor such as aluminum or copper cannot be directly provided on the base 23 but an electric insulation film is required on the surface of the base 23 and non-magnetic material 24. The electric insulation film may be formed by means of evaporation of SiO or $SiO_2$.

Figure 6:
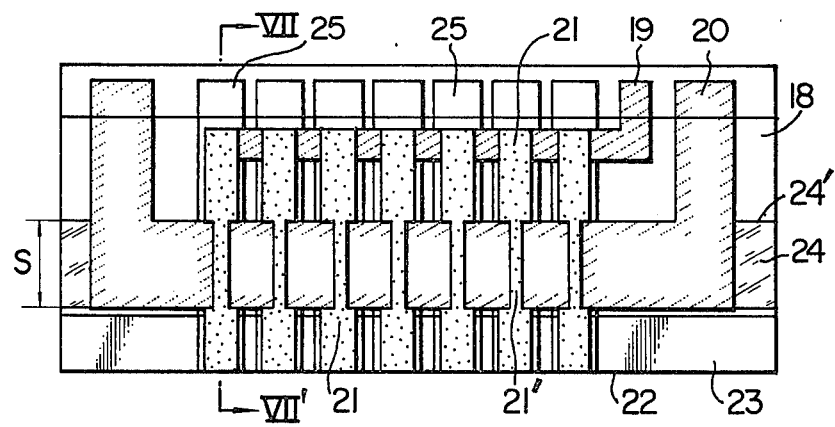
FIG. 6 is a plan view showing a second embodiment of the invention.

Then, signal detection coils 25 are formed respectively for each of the MR elements by forming a film of a conductor such as aluminum or copper by means of evaporation or the like and processing the film by means of photoetching or electron beam processing techniques such that the resultant coils extend normal to the groove and parallel to the individual MR elements as shown in FIG. 6. An electric insulating layer 18 of SiO or $SiO_2$ is then formed by means of sputtering or evaporation techniques to cover the coils 25 except for portions thereof adjacent to and most remote from the base face 22 to be in contact with the recording medium. Then, a film of a conductor such as aluminum or copper is formed on the insulating layer 18 by means of evaporation or sputtering and is processed by means of photoetching or electron beam processing techniques to form a bias coil 20 common to all the MR elements 21' and a common electrode 19 also common to all the elements. The bias coil 20 is provided on and parallel to the groove 24' while the common electrode 19 is provided at a portion on the side of the groove 24' distant from the face 22 for contact with the recording medium as shown in FIG. 7.

Then, the bias coil 20 is partly covered with an electric insulating film 23 such as a SiO or $SiO_2$ film so that it will not be short-circuited to the MR elements 21'. The MR elements 21' are then formed by forming a ferromagnetic material film on the insulating film 23 by means of evaporation or sputtering techniques such that their easy axis extends in the direction of width of the MR elements, that is, extends parallel to the groove 24'. It is effective that the MR elememts 21' are long enough to straddle the entire width S of the groove 24'. Simultaneously with the MR elements 21', high permeability flux converging cores 21 are provided between the groove 24' and the face 22 for contact with the recording medium and also at a portion on the side of the groove 24' distant from the recording medium. The flux converging cores 21 adjacent to the face 22 for contact with the recording medium are conductive with the associated coils 25 while those remote from the contact face 22 are conductive with the common electrode 19.

The magnetic head according to the invention is a multi-channel head particularly designed for reproducing recorded signals, and in its operation a voltage induced across each MR element 21' is detected. In operation, a signal magnetic field that appears from a recording medium found in the proximity of the contact face 22 is led across the coil 25 constituting a magnetic gap between the ferromagnetic material base 23 and each flux converging core 21 to thereby couple a magnetic potential to both ends of each MR element 21', and to both ends of the MR element 21' via the converging cores 21. Meanwhile, current is passed from each coil 25 provided for each element through the flux converging core 21 adjacent to the contact face 22 for contact with the recording medium, MR element 21' and flux converging core 21 remote from the recording medium to the common electrode 19, and the potential difference between the coil 25 and common electrode 19 is taken out as signal. When the signal field changes, the magnetic potential prevailing across the opposite ends of the MR element 21' is changed to change the resistance of the MR element, thus changing the potential difference between the coil 25 and common electrode 19 so that the recorded signal can be read out. In this way, the sum of the currents flowing through the individual MR elements 21' also flows through the common electrode 19, like the previous embodiment of FIGS. 3 and 4.

Figure 7:
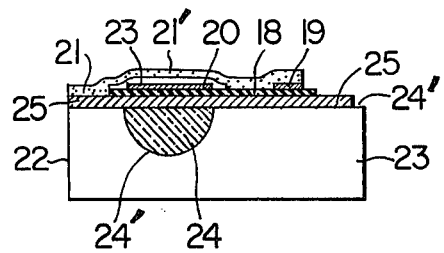
FIG. 7 is a section taken along line VII - VII' in FIG. 6.

With the above construction of FIGS. 6 and 7, in which the common electrode 19 is provided over the base on the side of the groove 24' which base is opposite to the base having the contact face 22, crosstalk or interference of signals between adjacent tracks is avoided. It will be noted that signal currents caused to flow through the individual coils 25 all flow into the common electrode, that is, the common electrode carries current that increases each time current from each element flows into it. Assuming now that the common electrode 19 finds itself, for instance, on portions of the coils 25 constituting the magnetic gap section or on the flux converging cores 21 adjacent to the face 22 for contact with the recording medium, the magnetic field coupled to each element would be changed whenever the current carried by the common electrode is increased to change the magnetic field set up therearound, so that crosstalk of signals from adjacent tracks would result. If the common electrode is provided on and parallel to the groove 24', the current carried by the common electrode is similarly increased every time current from each of the elements flows into it, and this again results in variations of the bias field given to each element and is hence impractical. It will thus be appreciated that with the provision of the common electrode at a place on the side of the groove 24' opposite the face 22 for contact with the recording medium, the magnetic field which is produced around the common electrode is shunted within the ferromagnetic material base so that crosstalk of signals from adjacent tracks can be avoided.

While in the above embodiment the common elecrode is formed by using such materials as aluminum and copper and separately from the flux converging cores, it is also possible to provide a common flux converging core electrode common to all the elements by using a conductive ferromagnetic material for the flux converging core. By forming the common electrode from a conductive ferromagnetic material the back gap can be reduced to improve the magnetic efficiency.

Figure 8:
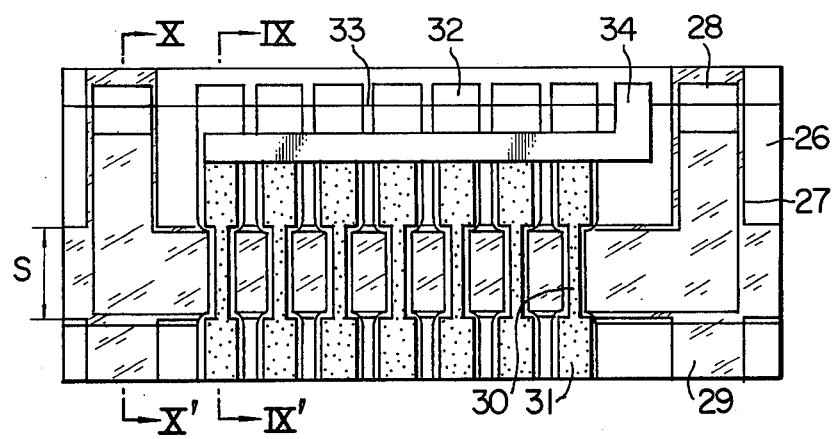
FIG. 8 is a plan view showing a third embodiment of the invention.
Figure 9:
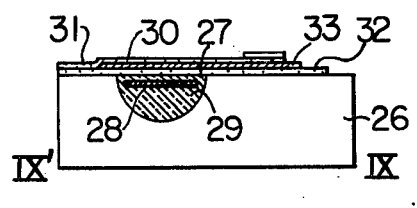
FIG. 9 is a section taken along line IX - IX' in FIG. 8.
Figure 10:
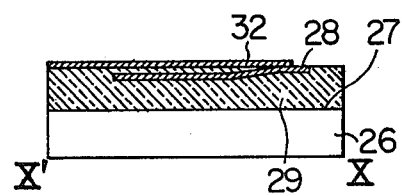
FIG. 10 is a section taken along line X - X' in FIG. 8.

A further embodiment of the invention is shown in plan view in FIG. 8 and in sections in FIGS. 9 and 10. In this embodiment, a bias coil 28 is buried in a non-magnetic insulating material 29 such as glass filling a groove 27 formed in a base 26. The surface of the groove 27 of the base 26 is polished so that there is no unevenness along the boundary between the non-magnetic insulating material 29 and base 26. As is seen, this embodiment is set apart from the preceding embodiment of FIGS. 6 and 7 in that unlike the preceding embodiment where the bias coil 20 is formed over the base 23, in the instant embodiment the bias coil 28 is buried embedded in the base 26. With this construction, there results no step or bend in the MR elements 30 in their portion intersecting the bias coil 28. The thickness of the MR elements 30 is usually thought to be about 500 angstroms to 2 microns. If the bias coil 28 had a thickness of about 1 micron and was formed over the base, a step of about 1 micron would result at the intersection between MR element 30 and bias coil 28, so that the MR element 30 whould be prone to disconnection.

For this reason, the bias coil 28 in the instant embodiment is buried in the base 26. Then, current supply coils 32 are uniformly formed on the cores by using evaporation or like means and photoetching techniques such that they are greater in size than and totally cover the shape of MR elements 30 and flux converging cores 31. Similar to the preceding embodiment an insulating layer 33 is formed such that there is electric conduction between flux converging cores 31 and coils 32, and then flux converging cores 31, MR elements 30 and common electrode 34 are formed.

FIG. 9 is a section taken along line IX – IX' in FIG. 8. As is shown, the bias coil 28 is buried in the non-magnetic insulator 29 such as glass filling the groove 27 formed in the ferromagnetic material base 26. The bias coil 28 is in the form of a thin film in this example, it may also be cylindrical. As shown in FIG. 10, the bias coil 28 extends through the groove 27 which has a lattice-like form, and the bias coil has perpendicular extension extending along the groove and crops out to the surface of the base so that electric contact may be provided with an external circuit.

As has been described in the foregoing, the multi-element magnetic head according to the invention in which MR elements are provided on a base and normal to a groove which is formed in the base and commonly to all the element and extending parallel to the recording medium, the drawback inherent in the prior art, namely the difficulty in increasing the density of the element arrangement and record density since it has been impossible to greatly reduce the width W corresponding to the track width of the MR element, can be overcome. In other words, by a construction such that the signal flux is led through flux converging core means to the MR elements and that the longitudinal direction of the MR element is normal to the frictional face, its dimension facing the recording medium can be reduced compared to the prior art arrangement. Further, the arrangement of the MR elements normal to the frictional face permits the use or provisions of a common electrode, thus permitting use of only a single electrode in each element unlike the prior art arrangement wherein each element requires two electrodes. Thus, it is possible to obtain a more dense arrangement of elements.

Furthermore, in accordance with the invention with the provision of the MR elements on the base such that they are normal to the groove formed in the base commonly to all elements and extending parallel to one recording medium while also providing high permeability ferromagnetic members such as permalloy at each of the two ends of each MR element, it is possible to solve three problems inherent in the prior art, namely, inability in manufacture to freely set and greatly reduce the width W corresponding to the track width of the MR element due to characteristic limitations, early deterioration of the characteristics of the MR element since it is in direct contact in use with the recording medium and hence wears quickly, and inferior magnetic efficiency due to lack in uniformity of the flux led to the MR element. More particularly, since the signal flux is led via converging cores to the MR element, it is possible to set the track width of the converging cores irrespective of the shape of the MR element and also change, if necessary, the track width without changing the shape of the MR element. Also, the flux coupled to the MR element is uniform in the width direction $u$ of the element, so that high magnetic efficienty can be obtained. Further, since the direct contact of the MR element with the recording medium is avoided by the flux converging core means, deterioration of the characteristics of the MR element due to wear thereof is eliminated.

Moreover, with the magnetic head according to the invention it is possible to reproduce high density recorded signals compared to the case using prior art multi-element magnetic heads. Also, since the wear characteristic can be improved because of the freedom from direct contact of the magnetoresistive effect element with the recording medium and also since the uniformity of the magnetic potential energy coupled to the element is increased by virtue of the flux converging means, it is possible to obtain reproduction of improved stability and efficiency.

Further, with the provision of the bias coil for commonly applying bias field to all the elements the distortion of the output signal can be made less.

In addition, by burying the bias coil in the base the step or steplike level difference of the MR element as its intersection with the bias coil can be eliminated to eliminate disconnection of the MR element, thus providing a construction capable of ready manufacture.

What is claimed is:

1. A multi-element magnetic head for use with a recording medium comprising
    a base composed of a ferromagnetic material, said base having a groove in the surface thereof filled with a non-magnetic material and extending parallel to a face of said base adapted for contact with said recording medium; and
    a plurality of magnetoresistive effect elements composed of a ferromagnetic material arranged on and bridging said groove, each said magnetoresistive effect element forming a magnetic circuit together with said ferromagnetic base, the resistance of said magnetoresistive effect element changing in accordance with an applied magnetic field.

2. The multi-element magnetic head according to claim 1, which further comprises a plurality of flux converging cores and a plurality of electrodes composed of a conductive magnetic material, one of said flux converging cores being connected to an end of each of said magnetoresistive effect elements and one of said electrodes being connected to the other end of each of said magnetoresistive elements.

3. The multi-element magnetic head according to claim 1, which further comprises a non-magnetic conductive layer extending parallel to said groove adjacent all of said magnetoresistive effect elements, and insulating means interposed between said non-magnetic conductive layer and said magnetoresistive effect elements.

4. The multi-element magnetic head according to claim 1 wherein the ferromagnetic material comprising said base is a ferrite, the ferromagnetic material comprising said magnetoresistive effect element is permalloy and the non magnetic material filling said groove is glass.

5. The multi-element magnetic head according to claim 2 wherein said flux converging cores and electrodes are made of permalloy.

6. The multi-element magnetic head according to claim 2, wherein a non-magnetic conductive layer common to said magnetoresistive effect elements is buried in the non-magnetic insulating material filling said groove.

7. The multi-element magnetic head according to claim 1, wherein said plurality of magnetoresistive effect elements are electrically connected to a common electrode.

8. The multi-element magnetic head according to claim 2, wherein the electrodes connected to said respecitve magnetoresistive effect elements are electrically connected to a common electrode.

9. The multi-element magnetic head according to claim 7, wherein said common electrode is made of a conductive magnetic material.

10. The multi-element magnetic head according to claim 8, wherein said common electrode is made of a conductive magnetic material.

11. The multi-element magnetic head according to claim 1, wherein the face of said base for contacting the recording medium is located on one side of said groove, and a common electrode connected to one end of each of said magnetoresistive effect elements is provided on said base on the other side of said groove.

12. The multi-element magnetic head according to claim 3, wherein said non-magnetic conductive layer is buried in the non-magnetic insulating material filling said groove.

13. The multi-element magnetic head according to claim 12 wherein said non-magnetic insulating material is composed of glass.

* * * * *